(12) United States Patent
Newman et al.

(10) Patent No.: US 7,855,802 B2
(45) Date of Patent: Dec. 21, 2010

(54) TIME-EFFICIENT GENERATION OF COLOR LOOK-UP TABLE

(75) Inventors: Todd D. Newman, Palo Alto, CA (US); John S. Haikin, Fremont, CA (US)

(73) Assignees: Canon Kabushiki Kaisha, Tokyo (JP); Microsoft Corporation, Redmond, WA (US)

( * ) Notice: Subject to any disclaimer, the term of this patent is extended or adjusted under 35 U.S.C. 154(b) by 1260 days.

(21) Appl. No.: 11/398,682

(22) Filed: Apr. 6, 2006

(65) Prior Publication Data

US 2007/0236744 A1 Oct. 11, 2007

(51) Int. Cl.
G06K 15/00 (2006.01)
(52) U.S. Cl. ............... 358/1.16; 345/501; 345/590; 345/593; 345/589; 358/1.9; 358/1.13; 358/518; 358/3.23; 382/162; 382/167
(58) Field of Classification Search .......... 358/1.16, 358/1.13, 1.9, 518; 382/162; 345/501, 590
See application file for complete search history.

(56) References Cited

U.S. PATENT DOCUMENTS

| | | | | |
|---|---|---|---|---|
| 5,331,440 A | * | 7/1994 | Kita et al. | 358/529 |
| 5,432,906 A | * | 7/1995 | Newman et al. | 345/501 |
| 5,721,572 A | * | 2/1998 | Wan et al. | 345/590 |
| 5,786,908 A | * | 7/1998 | Liang | 358/518 |
| 5,857,063 A | | 1/1999 | Poe et al. | 395/109 |
| 5,995,653 A | * | 11/1999 | Reed et al. | 382/162 |
| 6,583,824 B2 | | 6/2003 | Cacciatore et al. | 348/649 |
| 6,603,483 B1 | * | 8/2003 | Newman | 345/593 |
| 6,919,975 B1 | * | 7/2005 | Haikin et al. | 358/518 |
| 6,967,746 B1 | | 11/2005 | Walker et al. | 358/1.9 |
| 6,985,252 B1 | | 1/2006 | Kubo | 358/1.9 |
| 2001/0028471 A1 | * | 10/2001 | Hirokazu | 358/1.13 |
| 2002/0113982 A1 | | 8/2002 | Chang et al. | 358/1.9 |
| 2003/0053683 A1 | * | 3/2003 | Newman et al. | 382/162 |
| 2004/0109179 A1 | * | 6/2004 | Haikin et al. | 358/1.9 |
| 2004/0233484 A1 | * | 11/2004 | Seko et al. | 358/523 |

(Continued)

FOREIGN PATENT DOCUMENTS

WO 2005/109319 11/2005

OTHER PUBLICATIONS

International Search Report and Written Opinion dated Oct. 26, 2007 in PCT/US2007/06987.

*Primary Examiner*—King Y Poon
*Assistant Examiner*—David S Cammack
(74) *Attorney, Agent, or Firm*—Fitzpatrick, Cella, Harper & Scinto

(57) ABSTRACT

Color management which uses a color conversion LUT for transformation from an N-dimensional source device color space (N≧4) to a destination device color space, in which the color conversion LUT is constructed in a two-step process. In the first step, an intermediate color conversion LUT is constructed that converts colors in a three-dimensional device-independent color space through a gamut mapping step and through an inverse destination device transform so as to obtain colors in the destination device color space. In the second step, the overall color conversion LUT is obtained by applying a source device transform to color combinations in the source device color space so as to obtain color values in the three-dimensional device-independent color space, and thereafter performing three-dimensional color look-ups in the intermediate color conversion table.

10 Claims, 7 Drawing Sheets

U.S. PATENT DOCUMENTS

| | | | |
|---|---|---|---|
| 2005/0146734 A1 | 7/2005 | Stokes et al. | 358/1.9 |
| 2005/0249408 A1 | 11/2005 | Haikin et al. | 382/167 |
| 2005/0270321 A1 | 12/2005 | Ono | 347/14 |
| 2006/0033970 A1 | 2/2006 | Haikin | 358/518 |

* cited by examiner

TIME-EFFICIENT GENERATION OF COLOR LOOK-UP TABLE

BACKGROUND OF THE INVENTION

1. Field of the Invention

The present invention concerns construction of a color lookup table ("LUT") that implements a transformation from device colorant values in a source device color space, to device colorant values in a destination device colorant space.

2. Description of the Related Art

In color management, it is common to composite a series of color transformations into a single composite color look-up table ("LUT"). Typically, such a LUT combines the following transform pipeline into a single LUT: (1) a source device modeling step that converts source device control values into device-independent color values; (2) a color appearance modeling step that converts the device-independent color values into device and viewing condition independent color appearance values; (3) a gamut mapping step that converts color appearance values to fit within the gamut of the destination device; (4) an inverse color appearance modeling step that converts color appearance values into device-independent tristimulus values, relative to the destination viewing conditions; and (5) a destination device modeling step that converts the device-independent tristimulus values into destination device control values. Note that some of these steps, such as device modeling and color appearance modeling, can be combined within the scope of this invention. Also note that additional processing steps can be added to this pipeline without loss of generality.

Similarly, the International Color Consortium ("ICC") defines a transform-based model where there basically are two elements: a source color transform that transforms source device colors to a profile connection space ("PCS"), and a destination color transform that transforms PCS colors to destination device colors. In this case, a composite LUT is generally constructed by compositing two look-up tables that respectively represent the source and destination color transforms.

The size of the LUT is determined by several factors, namely, the number of color channels in the source device, the number of steps in the table for each source color channel, and the number of color channels in the output device. The formula for determining the table size is:

Size=(Number of steps per channel in the source device)$^{(Number\ of\ channels\ in\ source\ device)}$×(number of channels in output device)

As can be seen, the size of the table grows exponentially depending upon the number of channels in the source device.

A problem occurs in construction of such a LUT, particularly for "just in time" use for measurement only profiles ("MOPs"), since as the size of the LUT grows, the time taken to construct it also grows. Many source devices support three color channels (Red, Green, Blue, for example). However, if a source device supports four channels (CMYK, for example), the size of the table, and the time required to construct it, grows by a factor of the number of steps. In a measurement-based color management system, where transforms are constructed from MOPs 'on the fly', this time may well be unacceptable.

SUMMARY OF THE INVENTION

The invention addresses this situation by exploiting two observations concerning the nature of the overall color transform. First, while the source device may support more than three color channels, the intermediate device-independent color space only has three color channels and is therefore three-dimensional. Second, the most time-consuming part of the processing is usually not the device modeling (i.e., the conversion from device color coordinates to tristimulus values), but the gamut mapping.

Using these observations, it is possible to construct an intermediate color conversion look-up table ("LUT"), in which the intermediate color conversion LUT converts colors in the device-independent color space through the gamut mapping steps and finally through the output device color model. Construction of this table is of dimension 3.

Using the intermediate color conversion LUT, the fully dimensional final color conversion LUT can then be constructed. The input-side dimensionality of the final color conversion LUT is equal to the number of source device channels. The steps for constructing it are: (a) converting the source color combinations to intermediate device-independent space and (b) then, performing three-dimensional color look-ups in the intermediate color conversion LUT to finish the conversion to the output device color space.

Because of the preliminary construction of an intermediate color conversion table, the number of gamut mapping computations is reduced. Specifically, the number of gamut mapping computations is reduced from (number of steps in the lookup table)$^{(number\ of\ channels)}$ to (number of steps in the intermediate table)$^{(3)}$ Even though it is then necessary to perform the same number of computations for source device modeling as before (i.e., to perform this number of computations:

(number of steps in the lookup table)$^{(number\ of\ channels)}$)

and it is also necessary to perform three-dimensional table look-ups that were not required before, this is still much faster than the original calculation.

The above process will work well provided that there is no need to pass out-of-band information such as black weight from the source device model to some other component in the color transform. In this situation, where there is a need or a desire to pass out-of-band information from the source device model, an alternative process is to construct an intermediate color conversion table that converts colors in the device-independent color space through the gamut mapping steps only. Then, construction of the fully-dimensional final color conversion table proceeds by (a) converting the source color combinations to intermediate device-independent space, (b) performing the gamut mapping steps by performing three-dimensional color look-ups in the intermediate color table instead of applying the actual gamut mapping processes, and then, (c) using the resulting values from the gamut mapping steps, along with any out-of-band information, to compute the output device colorants using the output device model. This process also can be used when there is information transferred between the source and output device models even if there is no black channel, for example if the two modules are implemented with a plug-in architecture that allows for data interchange between modules.

The invention thus contemplates color management which uses a color conversion LUT in which the LUT is constructed in a two-step process, wherein in the first step an intermediate color conversion LUT is constructed that converts colors in a device-independent color space through a gamut mapping step and finally through the output device color model, and wherein in the second step the final color conversion LUT is obtained by converting source color combinations to intermediate device-independent space and performing 3-dimensional color look-ups in the intermediate color conversion table.

The invention also contemplates color management which uses a color conversion LUT in which the LUT also accommodates out-of-band non-colorimetric data such as black weight information. As before, the LUT is constructed in a two-step process, but the steps and the content of the intermediate color conversion LUT are slightly different. In the first step, an intermediate color conversion LUT is constructed that converts colors in a device-independent color space through a gamut mapping step only. In the second step the final color conversion LUT is obtained by converting the source color combinations to intermediate device-independent space, performing gamut mapping steps by performing three-dimensional color look-ups in the intermediate color table, and using the resulting values from the gamut mapping steps, along with any out-of-band information, to compute the output device colorants using the output device model.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

A color management system according to the present invention may be incorporated in an output device driver for execution in a computing device, such as a printer driver, embedded in the firmware of an output device, such as a printer, or provided in a stand-alone color management application for use on a general purpose computer. A particularly preferable arrangement is to incorporate the color management system directly into the operating system for the general purpose computer. It can be appreciated that the present invention is not limited to these embodiments and that the present invention may be used in other environments in which color management is used.

Figure 1:
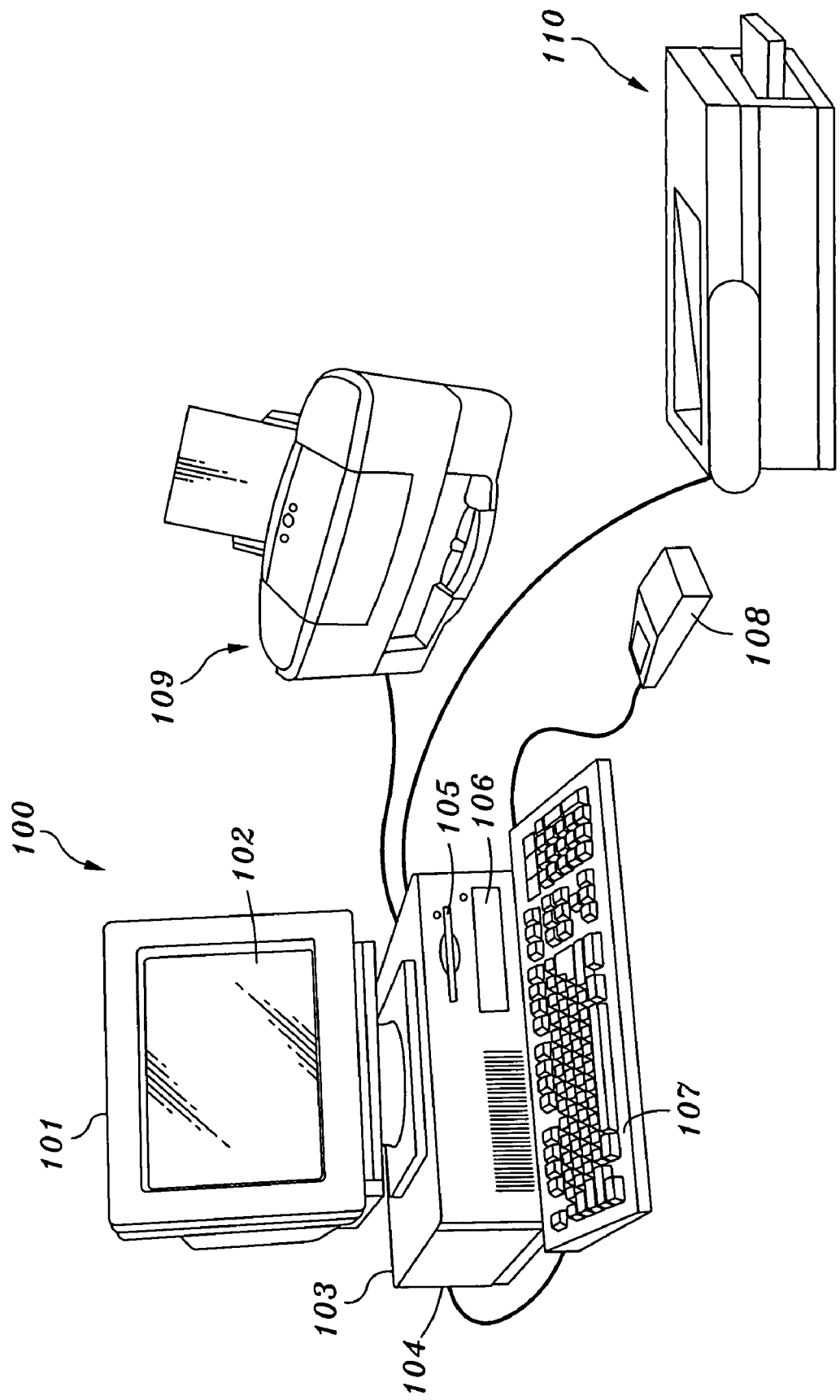
FIG. 1 is a representative view of a computer system in which the present invention may be implemented.

Referring to FIG. 1, a representative view of the outward appearance of a representative computing system including computing equipment, peripherals and digital devices which may be used in connection with the practice of the present invention is shown. Computing equipment 100 includes host processor 103 which comprises a personal computer (hereinafter "PC"). Provided with computing equipment 100 are color monitor 101 including display screen 102, keyboard 107 for entering text data and user commands, and pointing device 108. Pointing device 108 preferably comprises a mouse for pointing and for manipulating objects displayed on display screen 102.

Computing equipment 100 includes a computer readable memory medium such as computer fixed disk 106 and/or floppy disk drive 105. Floppy disk drive 105 provides a means whereby computing equipment 100 can access information, such as image color data, computer-executable process steps, application programs, etc. stored on removable memory media. A similar CD-ROM interface (not shown) may be provided for computing equipment 100 through which computing equipment 100 can access information stored on removable CD-ROM media.

Printer 109 is a first printer which forms color images on a recording medium such as paper or transparencies or the like. Printer 110 is a second printer which also forms color images on a recording medium such as paper or transparencies or the like. Preferably, printer 109 and printer 110 form color images using cyan, magenta, yellow and black inks, although the present invention can be used with printers and devices which use other colorant combinations that include black. The invention is usable with printers that use such colorant combinations, so long as the printer is capable of being interfaced to computing equipment 100.

Figure 2:
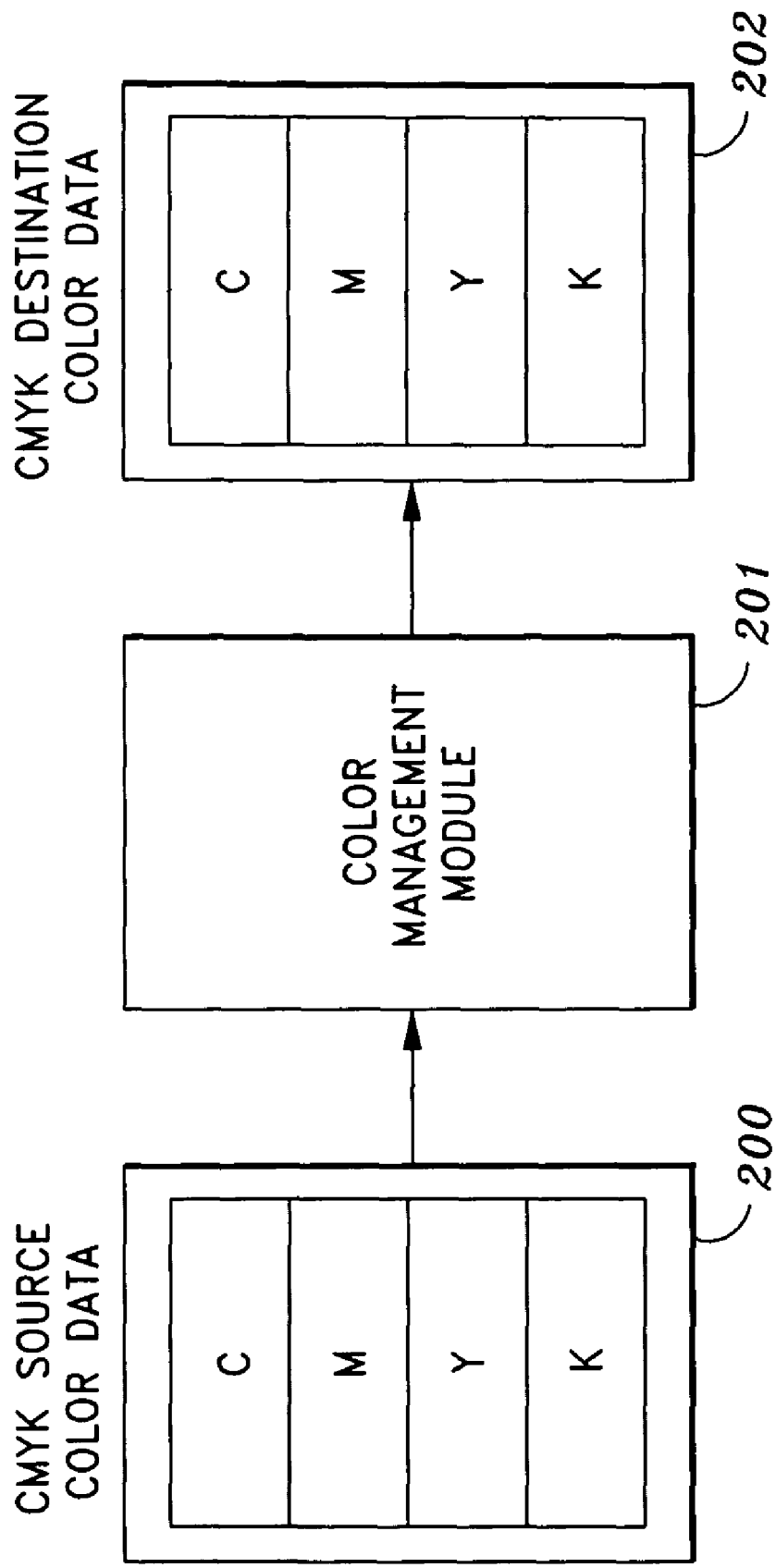
FIG. 2 is a view for providing a general explanation of a color management module according to the invention.

With reference to FIG. 2, a view for providing a general explanation of a color management according to the present invention is shown. The color management system is implemented in color management module (CMM) 201. CMM 201 is applied to CMYK source color data 200 in order to generate CMYK destination color data 202. Specifically, CMYK source color data includes a cyan color component C, magenta color component M, yellow color component Y and black color component K. Each of the aforementioned color components is represented by a value ranging from zero percent to 100 percent. In this manner, each pixel of a source color image can be represented by a CMYK combination, wherein the value of each color component of the color combination represents a device control value, most typically, a colorant value.

It is understood that the invention has greater utility when the source device color space has more than three dimensions, such as the above-described situation where the source device has four dimensions corresponding respectively to the C, M, Y and K colorant values. The destination device color space, however, need not have four dimensions, although it often does. One situation where the destination device color space might not have four dimensions is a proofing process, where it is desired to pre-screen a four-color printout on an RGB color monitor. In this situation, the destination device color space has only three dimensions. The advantageous effects of the invention are still obtained, however, since the source device color space has four or more dimensions.

Figure 3:
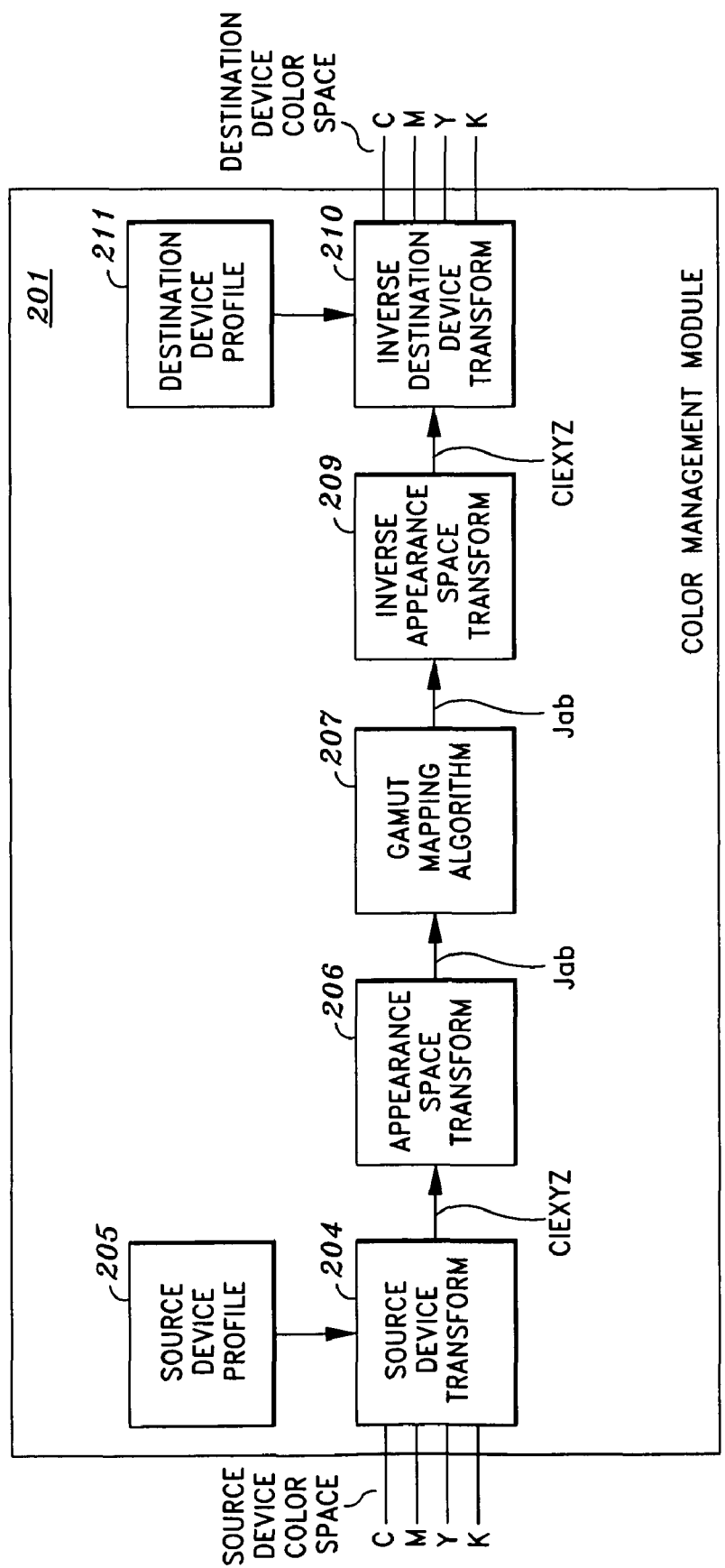
FIG. 3 is a representational view of color transform processing performed by a color management module according to the invention.

FIG. 3 is a explanatory view showing the transformation pipeline implemented by color management module 201. As seen in FIG. 3, the color management module accepts a CMYK color value in source device color space and applies a source device transform 204 so as to transform the color value in source device color space to a device independent color space such as CIEXYZ. Source device transform might be derived from a source device profile 205, which might be a measurement only profile ("MOP"). An appearance space transform 206 is thereafter applied to the device-independent color space, so as to transform the color value into a device-independent and viewing condition independent color space such as Jab color space. A gamut mapping algorithm 207 is applied to the transformed color value in Jab space, so as to accommodate differences between the color gamut of the source device and the color gamut of the destination device. The output of the gamut mapping algorithm 207 is a color value that remains in the Jab color space, meaning that the color space is still device-independent and viewing condition independent. An inverse transform 209 is thereafter applied so as to transform the color value into a device independent color space such as CIEXYZ. Finally, a destination device transform 210 (actually, and more accurately, an inverse transform) is applied so as to transform the color value in the device independent color space into a color value in the destination device color space. The destination device transform 210 might be constructed using a destination device profile 211, and the destination device profile 211 might be a measurement only profile.

Figure 4:
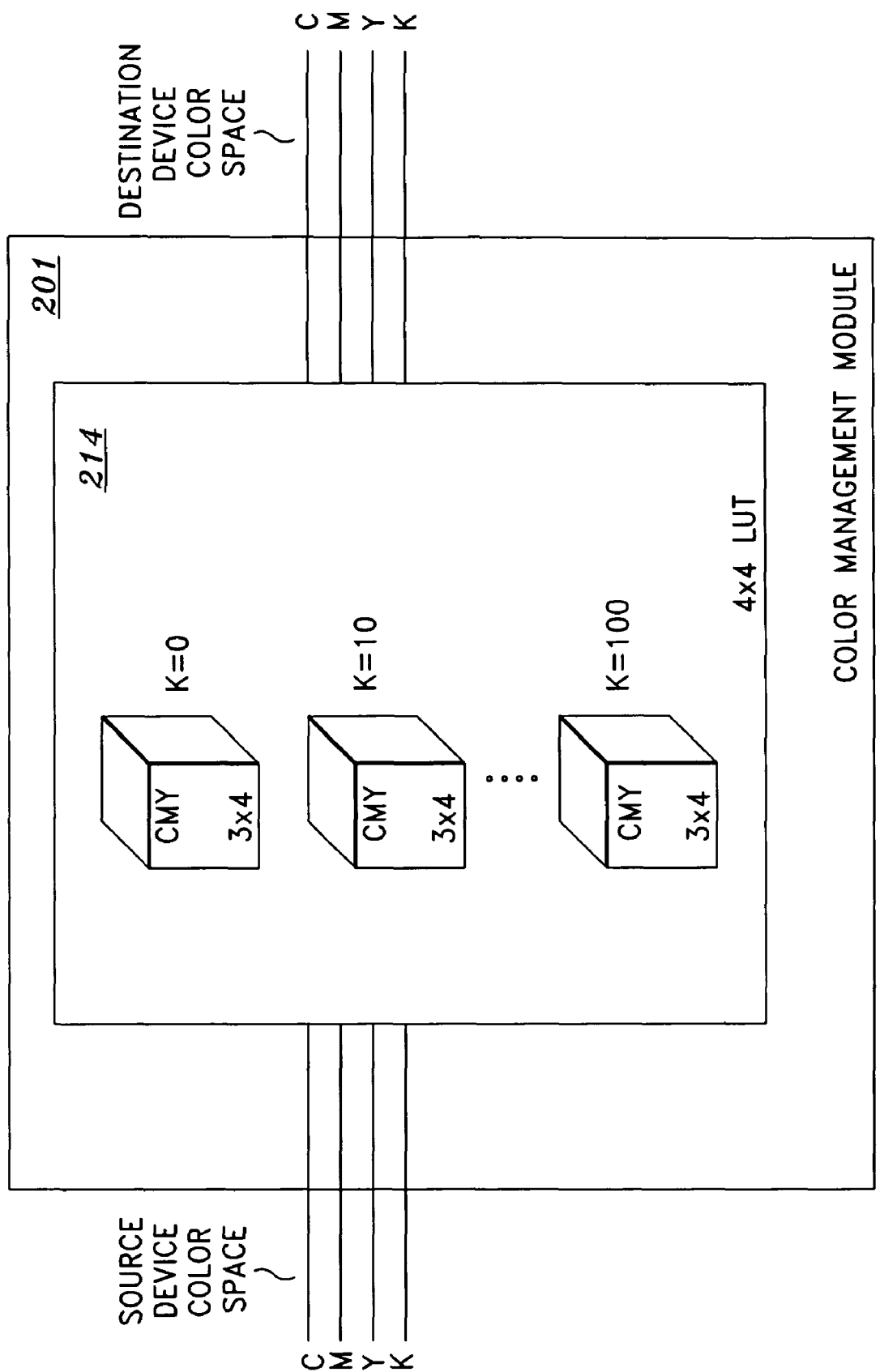
FIG. 4 is a view showing an N-by-M look-up table by which color transformation processing is performed.

The transformation pipeline shown in FIG. 3 is computationally intensive, and it ordinarily is not performed item-by-item as depicted in FIG. 3. Rather, the overall transformation pipeline is pre-calculated into a transformation LUT as depicted in FIG. 4, wherein the transformation pipeline has been composited into a single four-by-four color LUT. The first "4" in the four-by-four color LUT refers to the dimensionality in the source device color space, and the second "4" in the four-by-four color LUT refers to the dimensionality of the destination device color space. As shown in FIG. 4, actual implementation of the four-by-four color LUT is obtained through plural three-by-four color LUTs, one each for a corresponding multiplicity of values for the K channel, so as to achieve the overall effect of a four-by-four LUT. The color LUT includes addressable cells that are addressed using the CMYK values of the source device, and each cell has an entry that provides CMYK values in destination device color space. The entry for each cell represents the overall processing pipeline shown in FIG. 3, as applied to the input color value. Use of the color LUT is conventional: to obtain a CMYK value in destination device color space given a CMYK value in source device color space, one or more cells in the LUT are accessed using the address of the CMYK source device color space, and a corresponding CMYK value in destination device color space is calculated usually through interpolation.

Figure 5:
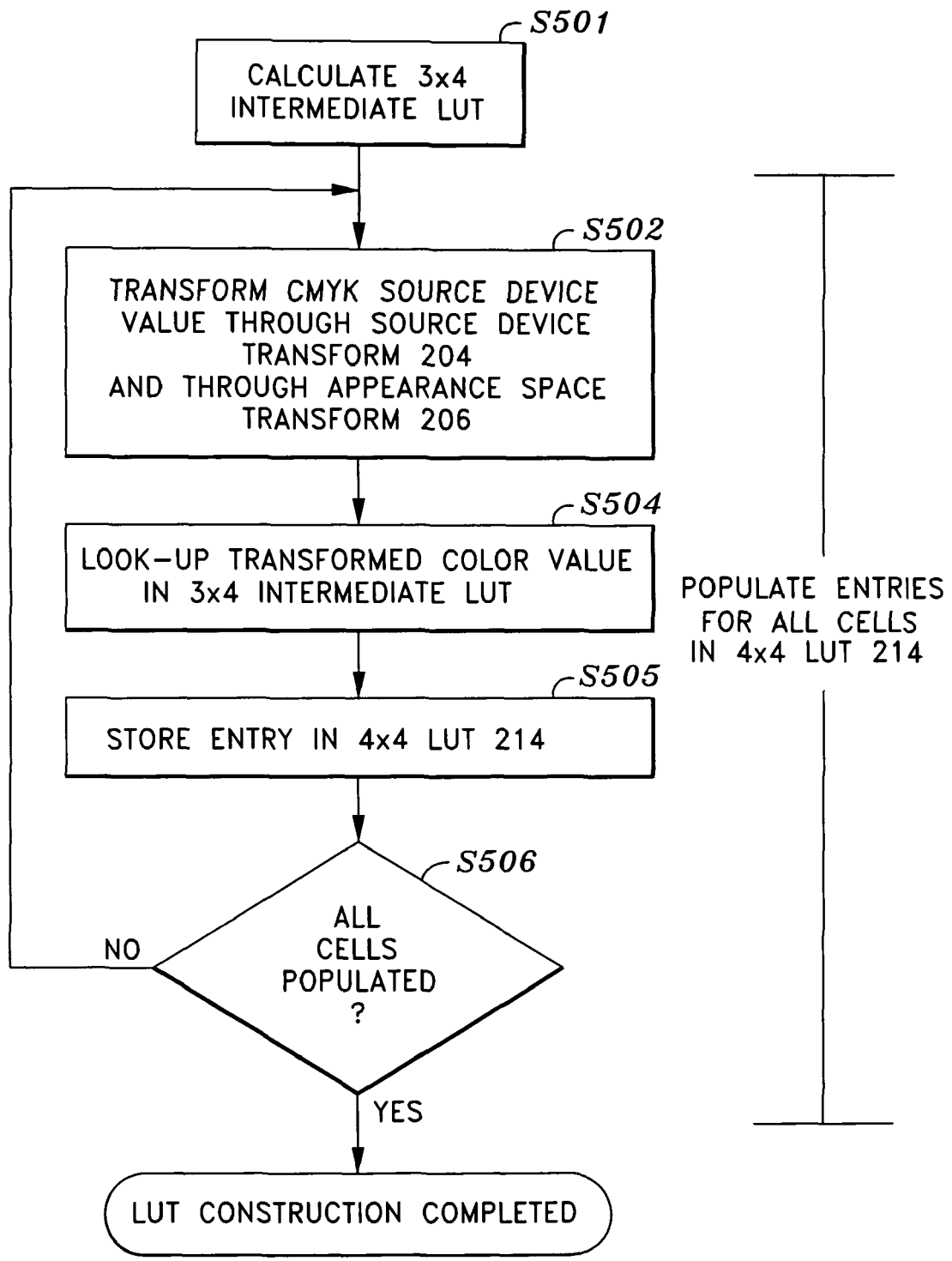
FIG. 5 is a flow diagram for explaining generation of an N-by-M color look-up table.

As explained above, generation of LUT 214 is computationally intensive and time consuming, particularly for just-in-time devices having MOP profiles. FIG. 5 is a flow diagram showing a computationally efficient technique according to the invention, for generating LUT 214. Briefly, according to the flow diagram of FIG. 5, a color conversion LUT is constructed in a two-step process, wherein in the first step an intermediate color conversion LUT is constructed that converts colors in a device-independent color space through a gamut mapping step and finally through an output device color model. The intermediate color conversion LUT has dimensionality three-by-M, wherein M is the dimensionality of the destination device color space. In the embodiment described here, M=4, since the destination device color space has dimensionality of four corresponding to each of the C, M, Y and K component. In the second step, the final color conversion LUT 214 is obtained by converting color combinations in source device color space to the device independent color space, and performing three-dimensional color lookups in the intermediate color conversion table.

In more detail, in step S501, an intermediate LUT is calculated, in which the intermediate LUT is a three-by-four color LUT. The intermediate LUT is a LUT for transformation from a device independent color space to a destination device color space. In this embodiment, the intermediate LUT transforms from Jab color space through to the CMYK destination device color space, and thus implements transforms 207, 209 and 210 shown in FIG. 3. Thus, the intermediate LUT includes a transform to implement a gamut mapping algorithm, an inverse transform from color appearance space to device-independent CIEXYZ color space, and a destination device transform 210 for transforming from device-independent color space to the CMYK destination device color space.

While it might seem natural to also include the appearance space transform 206 in the intermediate LUT, this embodiment of the invention does not do so. The reason for excluding the appearance space transform 206 from the intermediate LUT is that the CIEXYZ color space is not visually uniform, and thus is not well-suited for the interpolation that will be required in succeeding steps. Jab, on the other hand, is a visually more uniform color space, for which interpolation yields good results. Of course it is possible to include the appearance space transform 206 in the intermediate LUT, if desired, so long as the succeeding steps are adjusted so that the transform 206 is not applied twice. Moreover, if using a device independent color space that is more uniform than the CIEXYZ space used here, then it might well be more appropriate to include transform 206 in the intermediate LUT.

Steps S502 through S506 act to populate entries for all cells in four-by-four LUT 214. Specifically, in step S502, a CMYK value in source device color space is transformed through source device transform 204 into device-independent coordinates, and thence through appearance space transform 206 into device-independent and viewing-condition independent Jab color space. The specific CMYK value corresponds to the address of a cell in the four-by-four LUT 214. In step S504, the transformed color value, in the Jab device-independent and viewing-condition independent color space, is looked up in the intermediate LUT, so as to obtain a corresponding CMYK value in destination device color space. Typically, the value will be an interpolated value amongst multiple cells in the intermediate LUT. Step S505 thereafter stores the thus-obtained CMYK value in destination device color space into the cell in the four-by-four LUT 214 that corresponds to the CMYK value transformed in step S502. After all cells in four-by-four LUT 214 have been populated (step S506), the process terminates and results in a fully-populated LUT 214 for use in color management module 201.

The process described above is computationally efficient even though it is necessary to perform the same number of computations for source device color modeling as conventional techniques (i.e., the source device transform 204), and even though it is necessary to perform a three-dimensional table lookup in the intermediate LUT that are not required by conventional techniques that do not use an intermediate LUT. This is because the dimensionality of the source device color space is four or more dimensions.

The foregoing technique works well in all ordinarily-encountered situations, but must be modified when it is desired to pass out-of-band information from the source device to another component in the pipeline (typically the destination device), since this component cannot then be included in the intermediateLUT. Out-of-band information is "out of band" in the sense that it is outside of calorimetric processing, and typically includes non-colorimetric data. Most frequently, out-of-band information will include black weight information, which acts as a hint from the source device to the destination device so as to allow the destination device to do a better job at preserving color fidelity, particularly as regards black information. Other out-of-band information is contemplated, however, such as clear-coat information if the destination device includes a dimension for clear coat processing so as to achieve a gloss effect, non-colorimetric channels such as a printing press that permits application of silver or gold foil so as to achieve specular reflections, or non-colorimetric information such as time-dependent information that causes a pixel on a monitor to blink with a specific frequency so as to achieve a "twinkling" effect. In addition, it is not necessary for the out-of-band information to be passed to the destination device; rather, the invention contemplates passing out-of-band information to any component in the processing pipeline.

Figure 6:
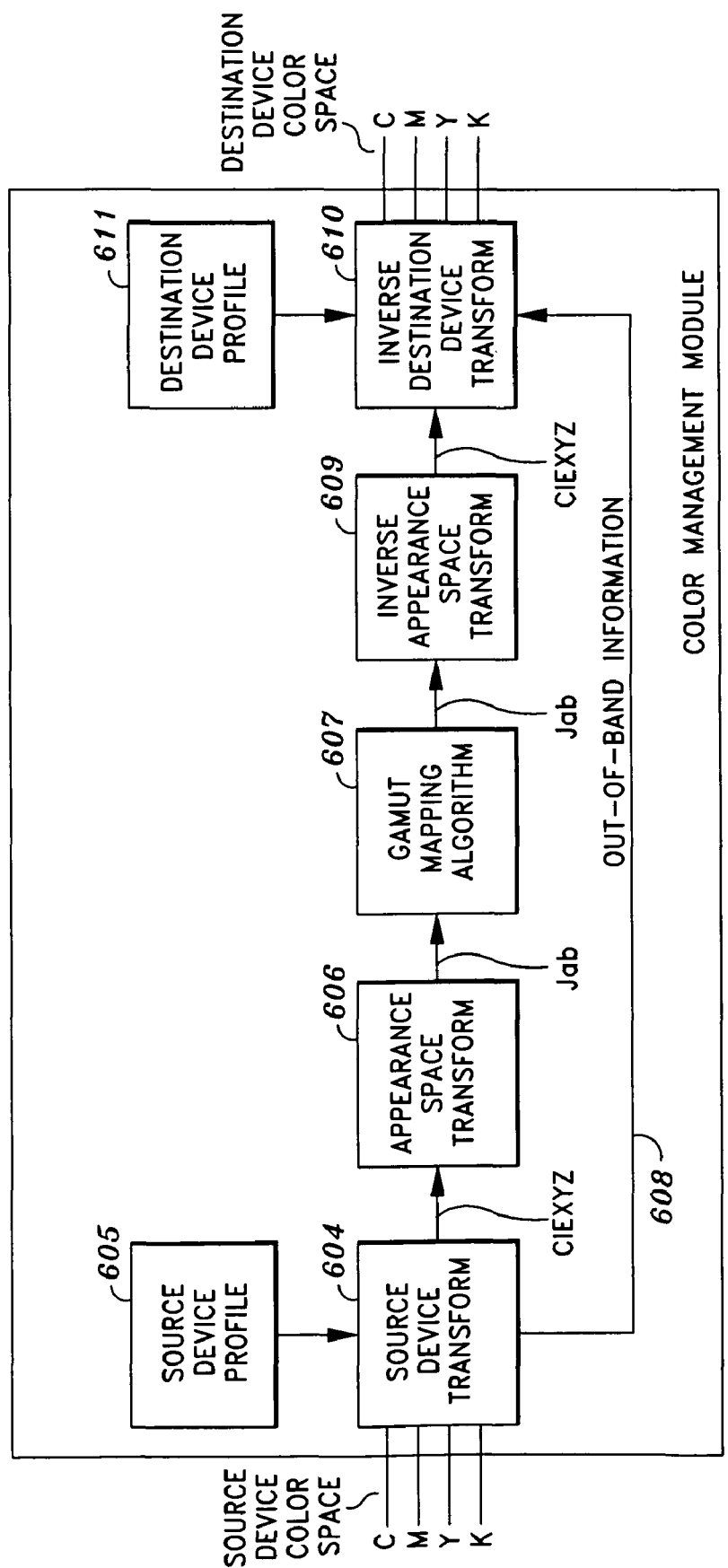
FIG. 6 is representational view of color transformation processing performed by a color management module according to the invention, including out-of-band information.

FIG. 6 shows a representational view, similar to that shown in FIG. 3, for out-of-band information. The blocks shown in FIG. 6 that are similar in functionality to those of FIG. 3 have been shown with similar reference numerals, and a detailed description thereof is omitted in the interests of brevity. FIG. 6 also shows out-of-band information 608 that is passed from the source device transform 604 to the destination device transform 610. The out-of-band information 608 in this case is a black weight, which as mentioned above provides a "hint" to the destination device transform 610 as to how the K component in destination device color space should be calculated, based on the way that the corresponding CMYK values were given in source device color space.

Again, the objective according to the invention is to generate a four-by-four color LUT which implements the overall transformation pipeline shown in FIG. 6. Again, this objective is met through calculation of an intermediate color LUT, and FIG. 7 is a flow diagram showing this embodiment of the invention.

Figure 7:
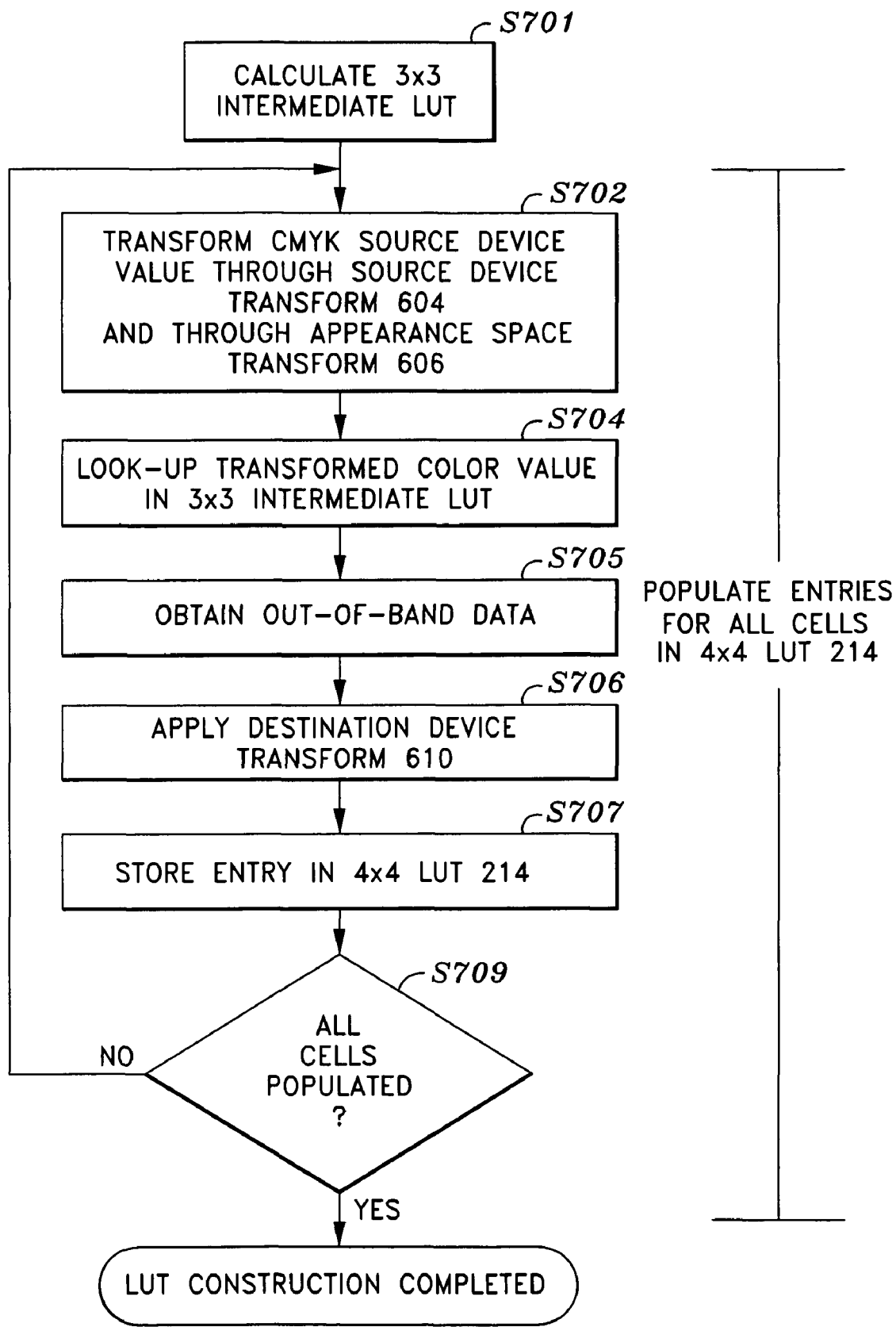
FIG. 7 is flow diagram for explaining generation of an N-by-M color look-up table including out-of-band data.

Briefly, according to FIG. 7, an overall color conversion LUT is constructed in a two-step process, of which in the first step an intermediate color conversion LUT is constructed that converts colors in a device-independent color space, through a gamut mapping step (and possibly other steps), resulting in a color in a device-independent color space. In the second step, the final color conversion LUT is obtained by converting source color combinations in source device color space to the intermediate-device independent space, for forming three-dimensional color look-ups in the intermediate color table (thereby performing the gamut mapping step), and thereafter using the resulting device-independent values, along with out-of-band information, to transform through the destination device transform 610 so as to result in color values in destination device color space.

In more detail, step S701 calculates a three-by-three intermediate LUT that comprehends a gamut mapping transform. The intermediate LUT transforms colors in device independent and viewing-condition independent color space such as Jab color space to a device independent color space which might be the CIEXYZ color space. As in the case of the FIG. 5 embodiment, the Jab color space was chosen for its visual uniformity and for its consequent well-behaved interpolation, but other color spaces can be chosen as appropriate. Non-uniformity in the color space for the intermediate LUT's output, however, as opposed to its input is acceptable and thus the intermediate LUT transforms from Jab to CIEXYZ. In the context of the embodiment shown in FIG. 6, the three-by-three intermediate LUT comprehends the transformations of gamut mapping 607 and inverse appearance transform 609. The dimensionality of the LUT is three-by-three since the dimensionality of the device independent color spaces is also three.

Steps S702 through S709 act to populate the entries for all cells in the final four-by-four LUT which comprehends the overall transformation pipeline of FIG. 6. Specifically, in step S702, a CMYK value in source device color space is transformed through source device transform 604 into device-independent coordinates, and thence through appearance space transform 606 into device-independent and viewing-condition independent Jab color space. The specific CMYK value corresponds to the address of a cell in the four-by-four LUT 214. Step S704 looks up the transformed color in the intermediate LUT obtained from step S701, so as to result in a gamut-mapped color value in device-independent color space CIEXYZ. Step S705 obtains the out-of-band information, which in this case is black weight information, and step S706 applies the destination device transform 610 to the device-independent color value obtained in step S704 as well as the out-of-band information. The resulting value is stored (step S707) as an entry in the four-by-four look-up table, and the process is repeated (step S709) until all cells in the overall look-up table have been populated.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A color management method comprising:
   a source device transform step for transforming color data in an N-dimensional source device color space into color data in a three-dimensional device independent color space by applying a source device transform, and for generating out-of-band information which is non-calorimetric information;
   an appearance space transform step for transforming the color data in the device independent color space into color data in a three-dimensional device-independent and viewing condition independent color space by applying an appearance space transform;
   a gamut mapping step for applying a gamut mapping algorithm to the color data in the three-dimensional device-independent and viewing condition independent color space so as to accommodate differences between a color gamut of a source device and a color gamut of a destination device;
   an inverse appearance space transform step for transforming the gamut-mapped color data in the three-dimensional device-independent and viewing condition independent color space into the color data in the three-dimensional device independent color space by applying an inverse appearance space transform; and
   a destination device transform step for transforming the color data in the device independent color space into color data in an M-dimensional destination device color space by applying a destination device transform based on the out-of-band information from the source device transform,
   the method further comprising:
   a constructing step for constructing a three-by-three intermediate conversion LUT through the gamut mapping step and the inverse appearance space transform step;
   a first transform step for transforming first color data in the N-dimensional source device color space corresponding to an entry of an N-by-M LUT into second color data in the three-dimensional device-independent and viewing condition independent color space by performing the source device transform step and the appearance space transform step;

a second transform step for transforming the second color data in the three-dimensional device-independent and viewing condition independent color space into third color data in the device independent color space by applying the three-by-three intermediate conversion LUT;

a third transform step for transforming, by performing the destination device transform step, the third color data into fourth color data in the M-dimensional destination device color space based on the out-of-band information corresponding to the first color data; and a storing step for storing the fourth color data in the N-by-M LUT, wherein the first transform step, the second transform step, the third transform step and the storing step are performed for each entry of the N-by-M LUT.

2. A color management method according to claim 1, wherein the source device transform is constructed based on measurement only profile information of the source device.

3. A color management method according to claim 1, wherein the intermediate color conversion LUT is a three-by-three color conversion LUT that converts colors in the device independent color space through a gamut mapping step into a three-dimensional device independent color space, and wherein said method further comprises the step of applying an inverse destination device transform so as to convert the device independent color values to color data in the destination device color space, and wherein the inverse destination device transform is constructed from a destination device measurement only profile.

4. A color management method according to claim 1, further comprising the step of converting color data from the source device color space to the destination device color space by interpolation in the N-by-M color conversion LUT.

5. A color management method according to claim 1, wherein the out-of-band information is comprised of non-colorimetric information.

6. A color management method according to claim 5, wherein the out-of-band information is comprised of black weight.

7. A color management module for generating a color conversion LUT for converting from an N-dimensional source device color space to an M-dimensional destination device color space, comprising:

a program memory for storing process steps executable to perform a method according to any one of claims 1 to 6; and a processor for executing the process steps stored in said program memory.

8. A non-transitory computer-readable memory medium having computer-executable process steps stored thereon, wherein said process steps perform the method according to claim 1.

9. Computer-executable process steps stored in a non-transitory computer-readable medium, wherein the process steps comprise code for performing the method according to claim 1.

10. A color management apparatus comprising:

a source device transform constructed to transform color data in an N-dimensional source device color space into color data in a three-dimensional device independent color space by applying a source device transform, and to generate out-of-band information which is non-calorimetric information;

an appearance space transform constructed to transform the color data in the device independent color space into color data in a three-dimensional device-independent and viewing condition independent color space by applying an appearance space transform;

a gamut mapping unit constructed to apply a gamut mapping algorithm to the color data in the three-dimensional device-independent and viewing condition independent color space so as to accommodate differences between a color gamut of a source device and a color gamut of a destination device;

an inverse appearance space transform constructed to transform the gamut-mapped color data in the three-dimensional device-independent and viewing condition independent color space into the color data in the three-dimensional device independent color space by applying an inverse appearance space transform;

a destination device transform constructed to transform the color data in the device independent color space into color data in an M-dimensional destination device color space by applying a destination device transform based on the out-of-band information from the source device transform;

a constructing unit for constructing a three-by-three intermediate conversion LUT through the gamut mapping unit and the inverse appearance space transform;

a first transform unit constructed to transform first color data in the N-dimensional source device color space corresponding to an entry of an N-by-M LUT into second color data in the three-dimensional device-independent and viewing condition independent color space by utilizing the source device transform and the appearance space transform;

a second transform unit constructed to transform the second color data in the three-dimensional device-independent and viewing condition independent color space into third color data in the device independent color space by applying the three-by-three intermediate conversion LUT;

a third transform unit constructed to transform, by utilizing the destination device transform, the third color data into fourth color data in the M-dimensional destination device color space based on the out-of-band information corresponding to the first color data; and a storage unit constructed to store the fourth color data in the N-by-M LUT, wherein the first transform unit, the second transform unit, the third transform unit and the storage unit together populate each entry of the N-by-M LUT.

* * * * *